Figure 1:
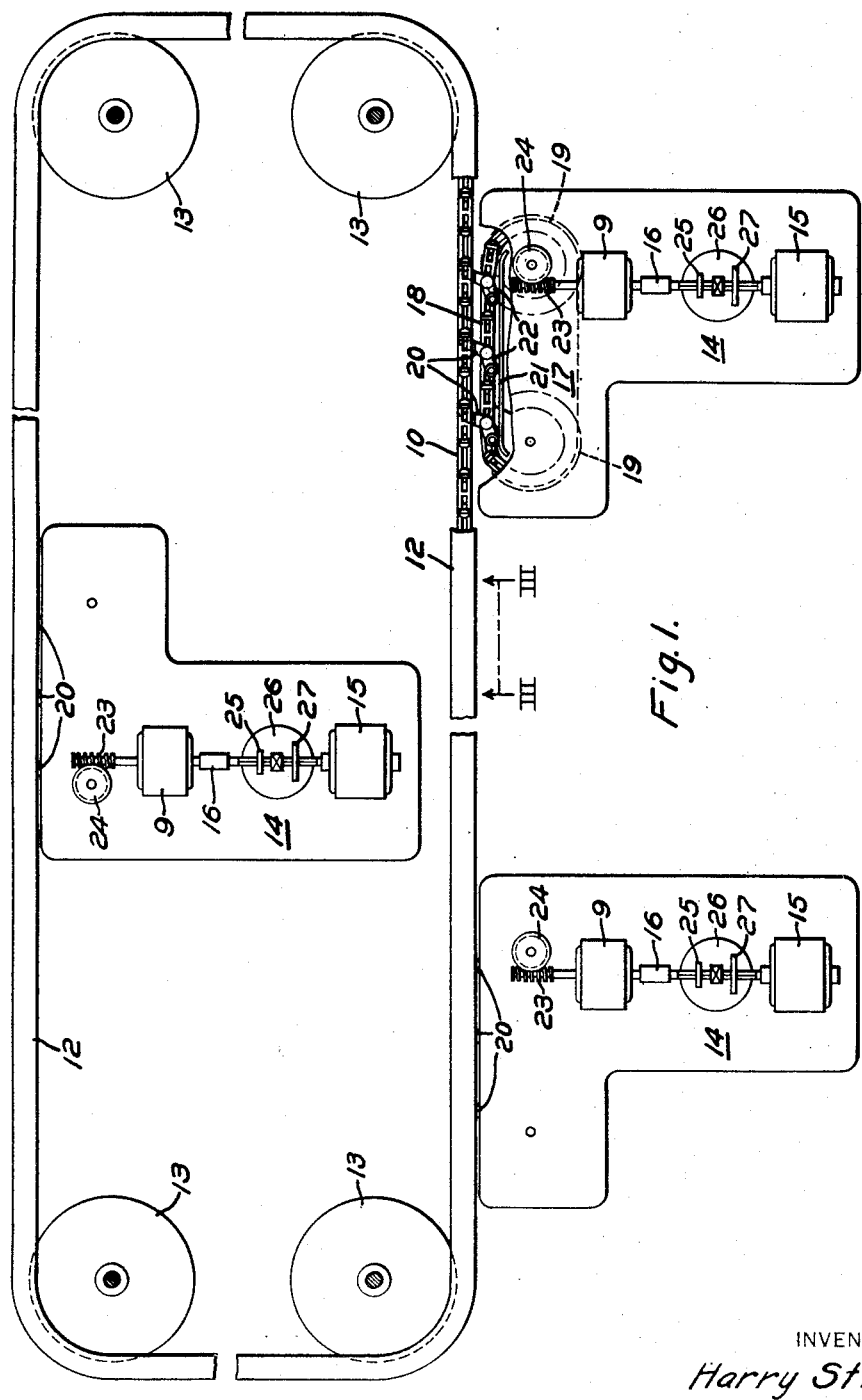

April 11, 1933.  H. STIBBS  1,903,488

CONVEYER SYSTEM

Filed Dec. 28, 1931  2 Sheets-Sheet 1

INVENTOR
Harry Stibbs.
BY F. M. Harris
ATTORNEY

April 11, 1933.  H. STIBBS  1,903,488
CONVEYER SYSTEM
Filed Dec. 28, 1931   2 Sheets-Sheet 2
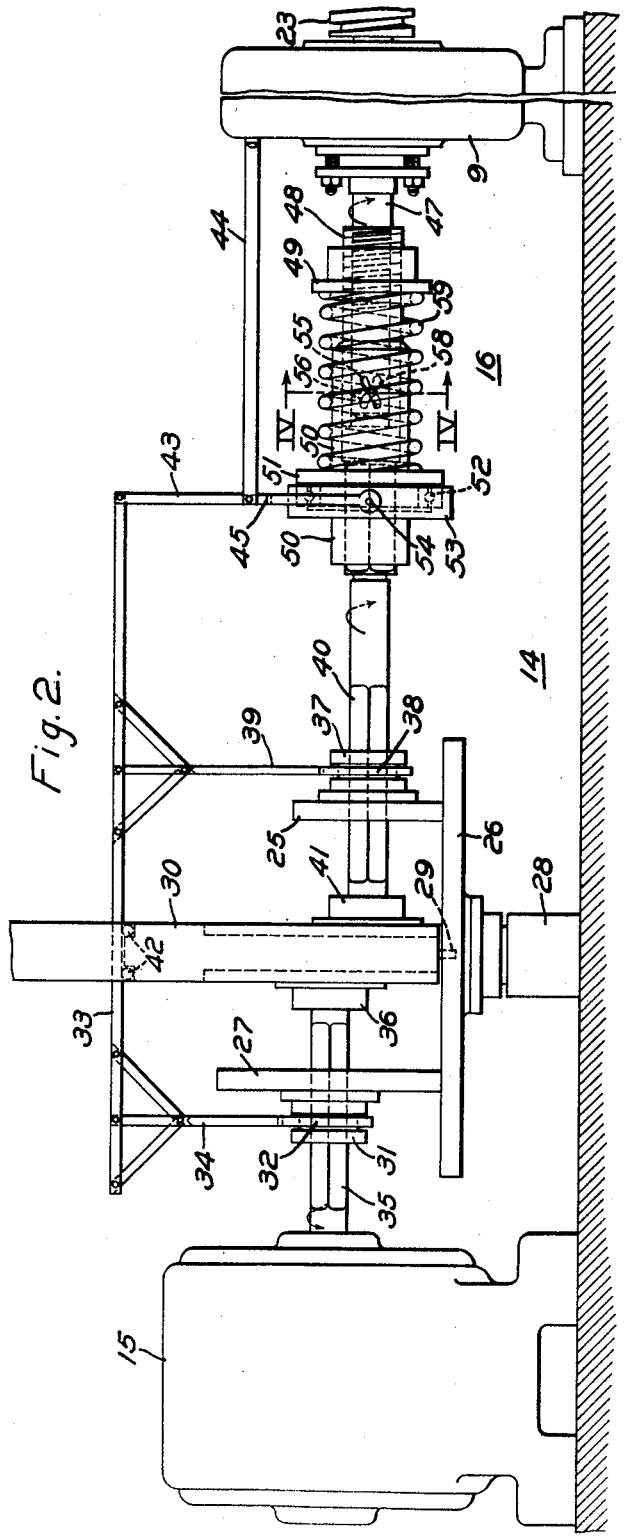
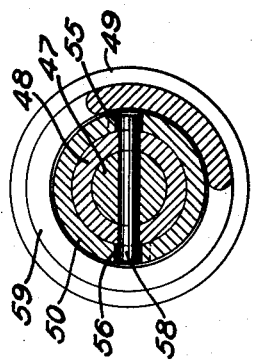
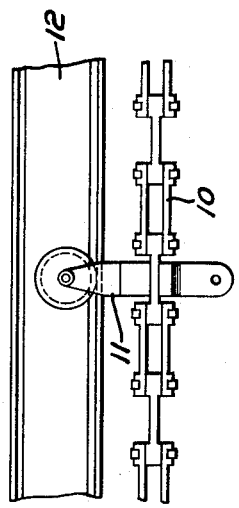
INVENTOR
Harry Stibbs.
BY F. M. Harris
ATTORNEY Patented Apr. 11, 1933

1,903,488

UNITED STATES PATENT OFFICE

HARRY STIBBS, OF PHILADELPHIA, PENNSYLVANIA

CONVEYER SYSTEM

Application filed December 28, 1931. Serial No. 583,479.

My invention relates to drives for conveyer systems and particularly to mono-rail systems in which the conveyer drive chain is driven by means of several motors connected to the drive chain at different points.

In large conveyer installations considerable difficulty has been encountered in driving the conveyer with only one motor because this puts a great strain on the conveyer chain and on the conveyer system in general. It has also been impractical to drive the conveyer at several points by means of separate motors for the reason that one of the motors will take more than its share of the load.

An object of my invention is to provide a system by means of which a conveyer may be driven by a plurality of motors.

A further object of my invention is to provide an improved transmission unit which automatically varies the "gear-ratio" between the motor and the driving unit engaging the chain.

In practicing my invention I couple a motor to the conveyer chain by means of a friction drive transmission unit which automatically causes the motor to drive the conveyer chain more slowly as soon as a load starts to "build up" on this one motor. The other motors, which are preferably connected to the conveyer chain through similar transmission units, are thereby caused to assume their proper share of the load.

Other features and advantages of my invention will appear from the following description taken in connection with the accompanying drawings in which, Figure 1 is a plan view of a conveyer system embodying my invention, Fig. 2 is a view in side elevation of the improved transmission unit employed in my conveyer system, Fig. 3 is a view taken on the line III—III of Fig. 1, Fig. 4 is a view taken on the line IV—IV of Fig. 2 looking in the direction of the arrows.

Referring to Fig. 1, the conveyer system is of the mono-rail type and comprises a conveyer chain 10 supported by means of trolleys 11 (Fig. 3). The trolleys 11 are suspended from the lower flange of an I-beam 12 which forms the conveyer track.

At each bend of the track 12 an idler wheel 13 is provided against which the conveyer chain 10 rides.

The chain 10 is driven by means of three similar power units 14, each unit comprising an electric motor 15, a friction drive represented by 25, 26 and 27, an automatic "gear changing" unit 16, a gear reduction unit 9, and a driving unit 17 which engages the conveyer chain 10. The motor may be of any type having a substantially constant-speed characteristic.

The driving unit is of the caterpillar type described in my application Serial No. 514,798 filed February 10, 1931. It comprises an endless chain 18 which is supported by the sprocket wheels 19. A plurality of dogs 20 are pivoted on the chain 18 and held against links of the conveyer chain 10 by means of a cam 21 which engages the cam arms 22. The cam 21 curves downward at its ends so that the dogs 20 do not engage the conveyer chain 10 until they are in position to drive directly in the line of motion of the chain 10 and so that they release as soon as they stop driving directly in said line of motion. The caterpillar chain 18 is driven through a worm gear 23 which meshes with a gear wheel 24 on a sprocket wheel 19.

The construction of the "gear changing" unit 16 can best be understood by referring to Figs. 2 and 4. Referring to these figures, the gear reduction unit 9 and worm gear 23 are driven by the motor 15 through three friction discs 25, 26 and 27. The lower disc 26 is rotatably mounted on a block 28 secured to a suitable foundation or support. The upper side of the disc 26 is further supported by means of a pin 29 which engages a bearing in the disc 26 and which extends from a post 30. The post 30 is rigidly fastened with respect to the block 28 by members not shown.

The left-hand disc 27 is fastened to a short shaft 31 which is rotatably mounted in a bearing 32 secured to the horizontal member 33 by means of the vertical member 34.

The disc 27 and shaft 31 have a square hole in the center which fits the square portion of the motor shaft 35 with a sliding fit. The right-hand end of the shaft 35 is supported in a bearing 36 secured to the post 30.

In a similar way the right-hand disc 25 is fastened to a short shaft 37 which is journaled in a bearing 38 fastened to a vertical supporting member 39. The member 39 is rigidly attached to the horizontal member 33.

The disc 25 and shaft 37 have a square hole in the center which fits the square portion of a shaft 40 with a sliding fit. The left-hand end of the shaft 40 is supported in a bearing 41 secured to the post 30.

The horizontal member 33 is slidably supported by the post 30 by means of a bearing indicated by the dotted roller bearings 42.

It will be apparent that if the horizontal member 33 is moved to the left, discs 27 and 25 are slid to the left on shafts 35 and 40, respectively, and the number of rotations per minute of shaft 40 and worm gear 23 is decreased, the motor speed being constant. This is the action that is desired when an increase in load is thrown on the worm wheel 23 and the load on motor 15 starts to build up.

The device for automatically moving the member 33 to the left in response to an increased load on worm gear 23 will now be described. The horizontal member 33 is pivotally fastened to a vertical lever 43 which has its fulcrum point at the end of a bar 44 attached to the gear reduction unit 9. The lever 43 is bifurcated below the point 45 to form a fork which straddles the shaft 40.

The gear reduction shaft 47 has a sleeve 48 keyed thereon. A collar 49 is fastened to the end of the sleeve 48 by screw-threads. A sleeve 50 is slidably mounted on both the right-hand end of the shaft 40 and the left-hand end of the sleeve 48.

The sleeve 50 is free to rotate on the sleeve 48 except for the pin and slot arrangement which will be described hereinafter. However, the sleeve 50 is not free to rotate on the shaft 40. The left end of the sleeve 50 is made with a square hole which fits over the square end of the shaft 40 with a sliding fit.

A collar 51 is keyed to the sleeve 50. It is made to engage the lever 43 through a ball bearing 52 which has its outer ring 53 pivoted to the bifurcated section by means of pins 54. This structure permits the collar 51 to rotate with the sleeve 50 and, at the same time, to transmit any sliding movement of the sleeve 50 to the lever 43.

The sleeve 50 has two slots 55 and 56 cut in opposite sides thereof as shown in Figs. 2 and 4. A pin 58 extends through the shaft 47 and sleeve 48 with the ends of the pin extending into the slots 55 and 56.

A compression spring 59 is located between the collars 49 and 51. When the motor rotates in the direction of the arrow, the force of the slots 55 and 56 driving against the pin 58 forces the sleeve 50 to the right so that the spring 59 is further compressed.

For a given load on the worm gear 23, a condition of equilibrium is reached, the force of the spring 59 against the collar 51 being equal to the force exerted by the slots 55 and 56 against the pin 58.

When the load increases, the force of the slots 55 and 56 against the pin 58 increases and the sleeve 50 and collar 51 are moved farther to the right against the spring 59. This moves the member 33 to the left and slides the discs 25 and 27 to the left along the shafts 40 and 35 so that the number of rotations per minute of shaft 40 decreases and the motor 15 assumes its share of the load. When the load on the worm gear 23 decreases, the reverse action takes place.

Various modifications may be made in my invention without departing from the spirit and scope thereof and I desire, therefore, that only such limitations be placed thereon as are imposed by the prior art and are set forth in the appended claims.

I claim as my invention:

1. In a conveyer system, a conveyer chain, a driving mechanism engaging said chain, a motor, and a transmission unit connecting said driving mechanism and said motor, said transmission unit comprising a plurality of friction discs and means for changing the relative positions of said discs in response to a change in load on said motor.

2. In a conveyer system, a conveyer chain, a driving mechanism engaging said chain, a motor, and a transmission unit connecting said driving mechanism and said motor, said transmission unit comprising a shaft and a sleeve which is movable in a longitudinal direction, means for causing relative movement in a longitudinal direction between said sleeve and said shaft in one direction, means for opposing said relative movement by an amount dependent upon the load on said motor, and means responsive to said relative movement for maintaining a substantially constant load on said motor.

In testimony whereof, I have hereunto subscribed my name this 16th day of December, 1931.

HARRY STIBBS.